W. STANLEY.
Grain Winnower.
No. 3,829.
Patented Nov. 18, 1844.
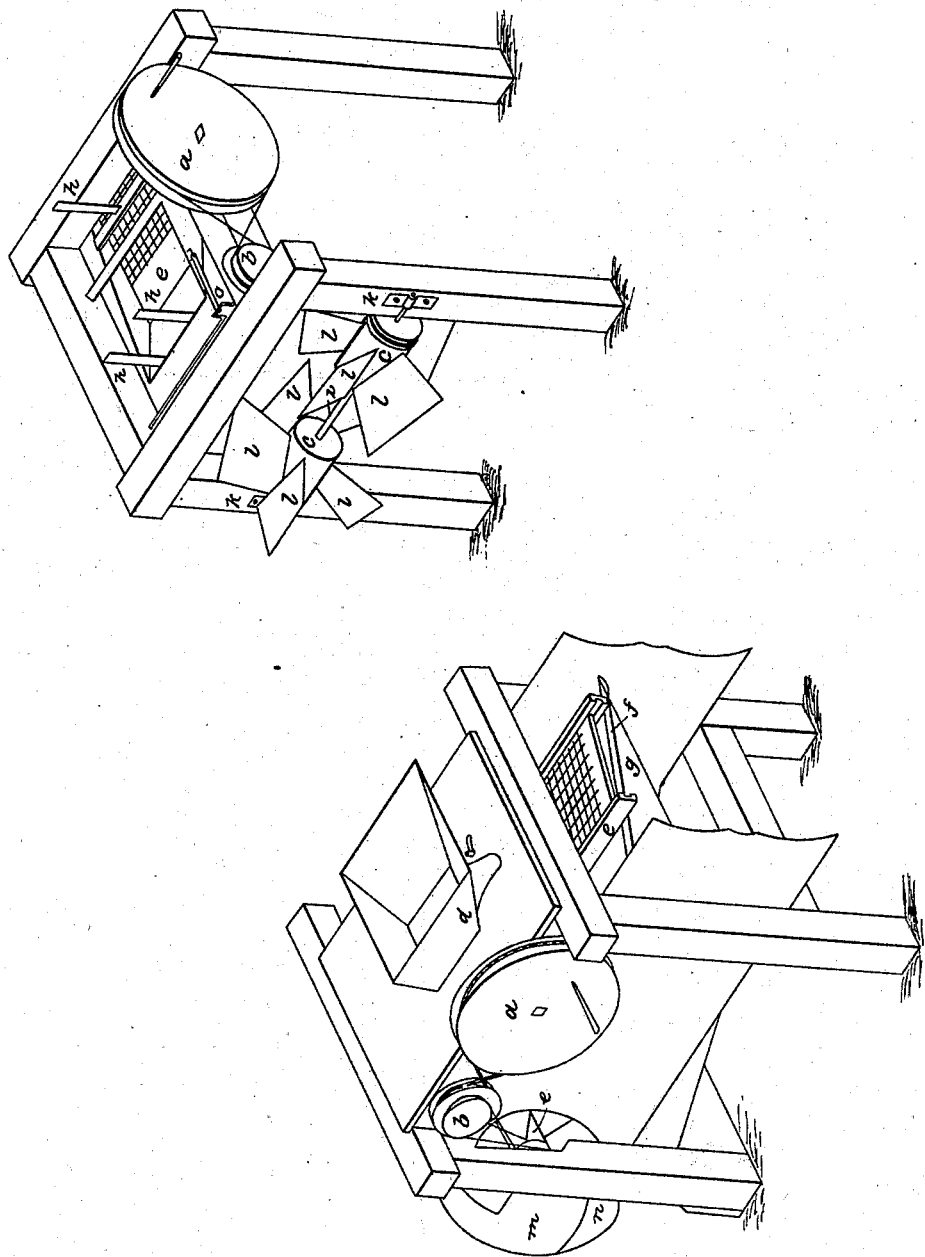

UNITED STATES PATENT OFFICE.

WILLIAM STANLEY, OF JAMESTOWN, NORTH CAROLINA.

WHEAT-FAN.

Specification of Letters Patent No. 3,829, dated November 18, 1844.

*To all whom it may concern:*

Be it known that I, WILLIAM STANLEY, of Jamestown, in the county of Guilford and State of North Carolina, have invented a new and Improved Windmill or Wheat-Fan; and I do hereby declare that the following is a full and exact description of the construction and operation of the same, reference being had to the accompanying drawings, forming a part of this specification.

Figure 1 is a perspective elevation of my wind mill or wheat fan; Fig. 2 is likewise a perspective elevation of the same, with some of its parts removed, for the purpose of showing the form of the spiral fan, and the manner of vibrating the screen.

The same letters of reference are used in both figures.

I construct my wind mill or wheat fan of scantling two and a quarter inches square. The frame is two feet and ten inches in height, two feet two and a half inches broad, and two feet four inches long. The frame has four upright parts framed together by two cross pieces framed in near the bottom of the same, and by two caps which likewise pass crosswise the frame, into which the tops of the four posts are mortised, and two pieces running lengthwise the frame and mortised into the posts near their tops.

$a$ is the driving wheel, the shaft of which passes through the two girders or pieces of scantling that run lengthwise the frame, a band from the driving wheel $a$ passes to the wheel $b$, the shaft of which likewise passes through the same girders or parts of the frame. A crank $o$ upon the shaft of the wheel $b$ vibrates the screen $e$, which is two feet in length and seventeen inches broad. A band passes from one of the grooves in the wheel $b$ to the wind wheel or fan, passing into one of the grooves in the hub $c$. At each end of the shaft $i$ of the wind wheel are two huds $c\ c$, three and a half inches in diameter and seven inches in length. The iron shaft $i$ of the wind wheel is confined by the two boxes $k\ k$ to the two front posts of the frame of the mill. Upon one of the hubs $c$ grooves are formed for receiving a band for propelling the same. Each of the hubs $c\ c$ have five wings groved or mortised into them, being placed at an angle of forty five degrees with the shaft $i$. The wings are designated by the letted $l$, they are eight inches in length, five inches in width where they enter the hubs $c\ c$ and nine inches in width at their outer ends; the outer edge of the wings to stand at right angles with the shaft $i$, which gives a slope to the inner edge of the same for the purpose of drawing the air in at each end, and at the same time forcing it out at the center upon the screen $e$. The wind wheel is covered in front by the half cylinder $m$, eighteen inches in diameter, open at each end, with the exception of the wind conductors $n$ at the bottom of the same, which are nine inches in length, three inches broad at one end, tapering to a point at the other. The use of the wind conductors $n\ n$ are to prevent a loss of air by preventing the wings upon the wind wheel from forcing out a portion of the air at that part of the half cylinder $m$ where they are placed. The screen board $g$, runs through the mill underneath the screen $e$ from back to front, for the purpose of conveying the grain after it passes through the screen, to the front of the mill.

$h\ h\ h$ are leather straps by which the screen $e$ is suspended.

$d$ is the hopper upon the top of the wind mill or wheat fan, into which the grain to be cleaned is to be placed, from which it falls upon the screen $e$.

The side plank upon the wheat fan are two feet and eleven inches in length, with a half circle fourteen inches in diameter, cut out of the front part of the same, opposite the wind wheel, for the purpose of admitting air to the same. The position of the wings $l$ are reversed at each end of the wind wheel, by which arrangement they draw the air in at both ends of the same, and force it out at the center at right angles with the shaft $i$ of the wind wheel.

Having thus fully described the construction and operation of my improved wind mill, or wheat fan, or winnowing machine, I would remark, that I do not claim a spiral fan wheel, as that has been before used with winnowing machines, but

What I do claim, is—

The placing upon the same shaft two spiral whels, so arranged and combined that the air shall be drawn in at both ends of the concave or cylinder which surrounds them and concentrated and forced out at the center upon the screens—or be used for any other purpose, where a strong blast of air is required—substantially in the manner herein described.

WILLIAM STANLEY.

Witnesses:
RICHD. MENDENHALL,
P. C. HORNEY.